March 30, 1965 F. H. LAISHLEY 3,176,159
SWITCHING CIRCUIT
Filed Sept. 10, 1962
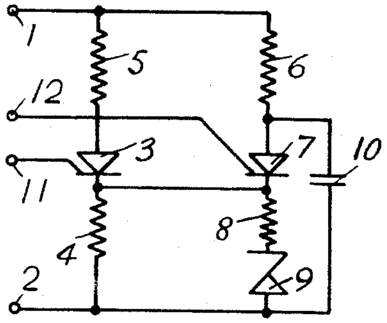

United States Patent Office 3,176,159
Patented Mar. 30, 1965

3,176,159

SWITCHING CIRCUIT

Frederick Herbert Laishley, Solihull, England, assignor to Joseph Lucas (Industries) Limited, Birmingham, England Filed Sept. 10, 1962, Ser. No. 222,383
Claims priority, application Great Britain, Sept. 18, 1961, 33,327/61
2 Claims. (Cl. 307—88.5)

The object of this invention is to provide in a convenient form a circuit which can be switched on or off by the application thereto of suitable pulses.

The invention makes use of a device known as a controlled rectifier, the characteristic of which is that it can be rendered conductive by a triggering pulse applied between its gate and cathode. Thereafter the controlled rectifier will continue to conduct, even when the triggering pulse is removed, until either the anode-cathode voltage or the anode-cathode current are reduced to predetermined values which are close to zero.

A switching circuit in accordance with the invention comprises in combination first and second terminals for connection to a D.C. source so as to be of relatively positive and negative polarities respectively, a first controlled rectifier having its anode connected to the first terminal and its cathode connected to the second terminal through a first resistor, a second controlled rectifier having its anode connected to the first terminal through a second resistor and its cathode connected to the second terminal through the first resistor, and a capacitor connected between the second terminal and the anode of the second controlled rectifier, the arrangement being such that in use a pulse applied to the gate of the first controlled rectifier will render it conductive, whereafter a pulse applied to the second controlled rectifier will render it conductive and allow the capacitor to discharge through the first resistor and thereby reduce the anode-cathode voltage of the first controlled rectifier sufficiently to switch it off, the value of the second resistor being chosen so that when the capacitor has discharged the current through the second controlled rectifier is reduced to a value such that it is switched off.

The accompanying drawing is a circuit diagram illustrating one example of the invention.

Referring to the drawing, the circuit may form part of a logical circuit network, and for this purpose there are provided first and second terminals 1, 2 adapted for connection to a D.C. source so as to be of relatively positive and negative polarity respectively.

There is further provided a first controlled rectifier 3 having its cathode connected through a resistor 4 to the terminal 2 and its anode connected to the terminal 1 through a resistor 5. The terminal 1 is further connected through a resistor 6 to the anode of a second controlled rectifier 7 the cathode of which is connected to the terminal 2 through a resistor 8 and a Zener diode 9 in series, and is further connected to the terminal 2 through the resistor 4. Finally, the anode of the second controlled rectifier is connected through a capacitor 10 to the terminal 2 and the gate of the controlled rectifiers 3, 7 are connected to input terminals 11, 12 respectively. The output from the circuit is taken from across the Zener diode.

In use, both controlled rectifiers are normally non-conductive and the capacitor 10 is charged. When a positive pulse is applied via the terminal 11 to the gate of the controlled rectifier 3, the latter is rendered conductive and the Zener diode conducts so that the circuit produces an output. When a positive pulse is applied via the terminal 12 to the controlled rectifier 7, the latter is rendered conductive and the capacitor 10 discharges through the resistors 8, 4 the purpose of the resistor 8 and the Zener diode 9 being to prevent the capacitor 10 from discharging into the output. Discharge of the capacitor 10 increases the cathode voltage of the controlled rectifier 3 with the result that its anode-cathode voltage falls to a value such that the controlled rectifier 3 is switched off. Moreover, the value of the resistor 6 is chosen so that when the capacitor 10 has discharged, the current through the controlled rectifier 7 is limited to a value such that the controlled rectifier 7 will be switched off.

Having thus described my invention what I claim as new and desire to secure by Letters Patent is:

1. A switching circuit comprising in combination first and second terminals for connection to a D.C. source so as to be of relatively positive and negative polarities respectively, a first controlled rectifier having its anode connected to the first terminal and its cathode connected to the second terminal through a first resistor, a second controlled rectifier having its anode connected to the first terminal through a second resistor and its cathode connected to the second terminal through the first resistor, a capacitor connected between the second terminal and the anode of the second controlled rectifier, and a third resistor and a Zener diode connected in series between the cathode of the second controlled rectifier and the second terminal, the arrangement being such that in use a voltage supplied to the gate of the first controlled rectifier will render it conductive, whereafter a voltage supplied to the second controlled rectifier will render it conductive, and allow the capacitor to discharge through the first resistor and thereby reduce the anode-cathode voltage of the first controlled rectifier sufficiently to switch it off, the value of the second resistor being chosen so that when the capacitor has discharged the current through the second controlled rectifier is reduced to a value such that it is switched off.

2. A switching circuit as claimed in claim 1 in which the anode of the first controlled rectifier is connected to the first terminal through a resistor.

References Cited by the Examiner

General Electric Controlled Rectifier Manual, 1960 (pages 72 and 73 relied on).

ARTHUR GAUSS, *Primary Examiner.*